United States Patent [19]
Ferry et al.

[11] Patent Number: 6,150,798
[45] Date of Patent: Nov. 21, 2000

[54] VOLTAGE REGULATOR

[75] Inventors: Claude Ferry, Le Fontanil; Carlos Serra, Le Versoud, both of France

[73] Assignee: STMicroelectronics S.A., Gentilly, France

[21] Appl. No.: 09/146,004

[22] Filed: Sep. 2, 1998

[30] Foreign Application Priority Data

Sep. 18, 1997 [FR] France ................................... 97 11837

[51] Int. Cl.⁷ ................................................... G05F 1/40
[52] U.S. Cl. ........................................... 323/273; 323/288
[58] Field of Search ................................... 323/273, 284, 323/285, 282, 224, 288, 266; 363/26, 23, 124

[56] References Cited

U.S. PATENT DOCUMENTS

| | | | |
|---|---|---|---|
| 4,502,152 | 2/1985 | Sinclair | 455/73 |
| 5,502,369 | 3/1996 | Niwayama | 323/273 |
| 5,563,498 | 10/1996 | Candy | 323/224 |
| 5,617,016 | 4/1997 | Borghi et al. | 323/284 |
| 5,627,460 | 5/1997 | Bazinet et al. | 323/288 |
| 5,731,731 | 3/1998 | Wilcox et al. | 327/403 |
| 5,773,966 | 6/1998 | Steigerwald | 323/284 |

FOREIGN PATENT DOCUMENTS

| | | | |
|---|---|---|---|
| 2 243 961 | 11/1991 | United Kingdom | H02M 3/04 |
| 2 310 570 | 8/1997 | United Kingdom | H04B 1/16 |

OTHER PUBLICATIONS

Japanese laid open publication No. 5–95670 together with translated Abstract Apr. 16, 1993.
Japanese laid open publication No. 5–260727 together with translated Abstract Oct. 8, 1993.
Japanese laid open publication No. 7–177732 Jul. 14, 1995.
Japanese laid open publication No. 7–325632 together with translated Abstract Dec. 12, 1995.
Japanese laid open publication No. 9–140126 May 27, 1997.
French Search Report from French Patent Application 97 11837, filed Sep. 18, 1997.

*Primary Examiner*—Peter S. Wong
*Assistant Examiner*—Rajnikant B. Patel
*Attorney, Agent, or Firm*—Wolf, Greenfield & Sacks, P.C.; James H. Morris; Theodore E. Galanthay

[57] ABSTRACT

The present invention relates to a voltage regulator of a voltage meant to supply a load from a battery, including a first switched-mode power supply type voltage regulation component, a second linear regulator type voltage regulation component, and a control circuit that selects one of the two regulation components according to the voltage difference between the battery voltage and the output voltage.

13 Claims, 4 Drawing Sheets

VOLTAGE REGULATOR

BACKGROUND OF THE INVENTION

1. Field of the Invention

The present invention relates to the field of d.c./d.c. voltage converters for supplying a load by maintaining the voltage across the load at a predetermined value. The present invention more specifically applies to step-down type converters meant to supply, by means of a battery, a mobile device. In particular, the present invention applies to supplying a mobile phone from a rechargeable battery.

2. Discussion of the Related Art

D.c./d.c. converters can be essentially divided into two categories. A first category involves switched-mode power supplies and a second category involves linear regulators.

FIG. 1 shows an example of a conventional converter of switched-mode power supply type (SMPS). Such a converter includes two P-channel and N-channel MOS transistors, respectively, MP and MN, connected in series between two terminals A, B, that are used to apply a d.c. input voltage Vbat provided, for example, by a rechargeable battery 2. Terminal B represents the circuit ground. The midpoint 3 of the series connection of transistors MP and MN is connected to a first terminal of an inductance L. A second terminal of inductance L is directly connected to an output terminal S meant to supply a load Q at a predetermined voltage Vout. A storage capacitor C, generally a chemical capacitor of high value, is connected between terminal S and the ground. A decoupling capacitor C' is further generally connected between the second terminal of inductance L and the ground. It generally is a ceramic capacitor of low value. Inductance L is associated with a recovery diode D connected between its first terminal and the ground. A pulsewidth modulation (PWM) control block 1 controls transistors MP and MN to provide an output voltage Vout at the desired predetermined value. Block 1 receives a signal FB taken at the midpoint of a series connection of resistors R1 and R2 connected between terminal S and the ground. Block 1 further receives a clock signal (not shown) and a capacitor Cin is generally connected in parallel on the battery between terminals A and B. The operation of such a converter is well known and will not be further described.

FIG. 2 shows an example of conventional diagram of a positive voltage linear regulator. Such a regulator essentially includes an amplifier 4 that controls a power component MP that supplies a load Q at a predetermined voltage Vout. A rechargeable battery 2 is connected between input terminals A and B of the regulator, terminal B forming the ground of the assembly. Load Q is connected between an output terminal S of the regulator and the ground. The power component is generally formed of a MOS transistor, for example, with a P channel, to minimize, with respect to the use of a bipolar transistor, the so-called waste voltage, that is, the voltage drop between terminals A and S of the regulator, and to save the current "entering" through the base of a bipolar transistor. The source of transistor MP is connected to terminal A while its drain forms terminal S. A decoupling capacitor C' is generally connected between terminal S and the ground, and a capacitor Cin is generally connected between terminals A and B in parallel on rechargeable battery 2. Amplifier 4 includes a first inverting input connected to a terminal R on which is applied a reference voltage Vref. A second non-inverting input of amplifier 4 is connected to the gate of transistor MP to modify, according to the error voltage between the inverting and non-inverting inputs, the gate-source voltage of transistor MP, and thus maintain voltage Vout at reference value Vref.

The choice between a switched-mode power supply and a linear regulator depends on the application and, in particular, on the type of rechargeable battery used.

Indeed, the evolution of the discharge of rechargeable batteries is different according to their type. For example, cadmium-nickel (Ni-Cd) type batteries have an abrupt discharge characteristic, that is, the voltage that they provide remains substantially steady before abruptly dropping. Conversely, batteries of lithium-ion (Li-ion) type have a smooth discharge characteristic, that is, the voltage that they provide progressively decreases along their use.

This is particularly disturbing in the specific application to mobile phones. Indeed, in such an application, several phones (for example, 8) share a same communication channel. As a result, the needs in current of a given phone are not constant. It is generally required to switch from a full charge mode to a mode of almost no current in less than 10 µs. This raises no problem if the battery voltage is sufficiently high with respect to the output voltage. Conversely, if the input voltage is low, then this constraint cannot be respected, since the current slope is linked to inductance L (FIG. 1). To respect this constraint, the switched-mode power supply should be operated at much higher frequencies than their usual frequencies on the order of 200 kHz.

Another disadvantage of a step-down type switched-mode power supply is that it has a higher waste voltage than a linear regulator. In practice, a switched-mode power supply requires at least 3 volts of supply voltage for an output voltage of 2.7 volts.

Further, in a mobile phone, the switched-mode power supply has two operating modes. A first operating mode is meant for periods of high current consumption by the load. In this mode, the control pulse trains have a fixed frequency. In such an operating mode, the internal consumption of the switched-mode power supply is on the order of 1 mA. A second operating mode (generally referred to as "PFM in SKIP MODE") is an operating mode where, while remaining synchronous with the fixed frequency of the first mode, clock cycles are skipped. Thus, in the second operating mode, not only the pulsewidth varies, but also the frequency. This operating mode is meant for periods of lower current surge by the load and results in a lower internal power consumption on the order of 100 µA. However, the frequency decrease of the pulse train introduces a noise problem since the frequency is generally in the audio band used by telephony. It is thus necessary to use additional filters to avoid disturbances.

This would thus lead to a preference for linear regulators, in particular, for lithium-ion batteries. However, a linear regulator has other disadvantages.

A disadvantage is that the efficiency of such a regulator is inversely proportional to the input voltage. Thus, for a lithium-ion battery, a very poor efficiency is obtained when the battery is in full charge. Further, since the power consumption of the linear regulator is substantially constant whatever the current consumed by the load, this consumption is linked to the maximum current for which the regulator is provided, and is then particularly high in low current surge periods.

With nickel-cadmium batteries having a nominal voltage which is higher and not too far from the regulator output voltage, a linear regulator is generally used since the decrease in the voltage of the battery has a slope close to zero until the time when it abruptly drops.

SUMMARY OF THE INVENTION

The present invention aims at overcoming the disadvantages of conventional voltage regulators by providing a novel voltage regulator which operates properly whatever the type of rechargeable battery which supplies it.

The present invention also aims at providing such a regulator which improves (by effectively lowering) the operating input voltage threshold below which the regulation is no longer ensured, with respect to a switched-mode power supply system.

The present invention also aims at optimizing the efficiency of the voltage supply to the load, whatever the operating mode and/or the battery voltage level.

The present invention further aims at having the regulator rapidly switch from full charge periods to low charge periods.

A characteristic of the present invention is to enable the association, within the same voltage regulation circuit, of a switched-mode power supply system and of a linear regulation system. Another characteristic of the present invention is to enable a selection between a switched-mode power supply operation and a linear regulator operation, at least according to the voltage available across the rechargeable battery and, preferably, also according to the current consumed by the load.

More specifically, the present invention provides a voltage regulator meant to supply a load from a battery, including a first switched-mode power supply type voltage regulation component, a second linear regulator type voltage regulation component, and a control means for selecting one of the two regulation components according to the voltage difference between the battery voltage and the output voltage.

According to an embodiment of the present invention, the linear regulation component is selected when the voltage difference is lower than a first predetermined threshold value.

According to an embodiment of the present invention, the control means selects one of the regulation components according to the current consumed by the load.

According to an embodiment of the present invention, the switched-mode power supply component is selected when the current consumed by the load is higher than a second predetermined threshold value.

According to an embodiment of the present invention, the switched-mode power supply component is selected when the voltage difference is higher than the first threshold value and the current consumed by the load is higher than the second threshold value.

According to an embodiment of the present invention, the voltage regulator includes two MOS transistors connected in series between two terminals that receive the battery voltage, a pulsewidth modulation control circuit that controls the transistors, a linear control circuit that controls the first transistor, and a selection circuit that selects the control circuit.

According to an embodiment of the present invention, respective output signals of the control circuits, sent onto the gate of the first MOS transistor, are provided by tri-state amplifiers.

According to an embodiment of the present invention, the voltage regulator includes an unregulated operating mode, in which the first transistor is saturated.

According to an embodiment of the present invention, the voltage regulator is meant to supply a mobile phone, and includes a terminal that receives a signal indicative of the stand-by state of the mobile phone.

The foregoing objects, features and advantages of the present invention will be discussed in detail in the following non-limiting description of specific embodiments in connection with the accompanying drawings.

DETAILED DESCRIPTION

Figure 1:
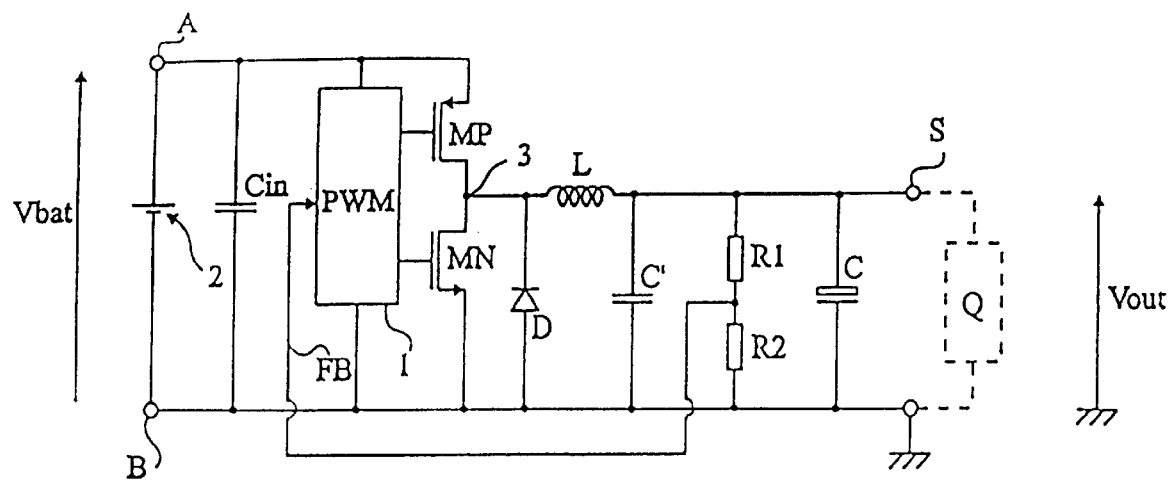
FIGS. 1 and 2, previously described, are meant to show the state of the art and the problem to be solved.

The same elements have been referred to with the same references in the different drawings. For clarity, only those elements necessary to the understanding of the present invention have been shown in the drawings and will be described hereafter.

Figure 3:
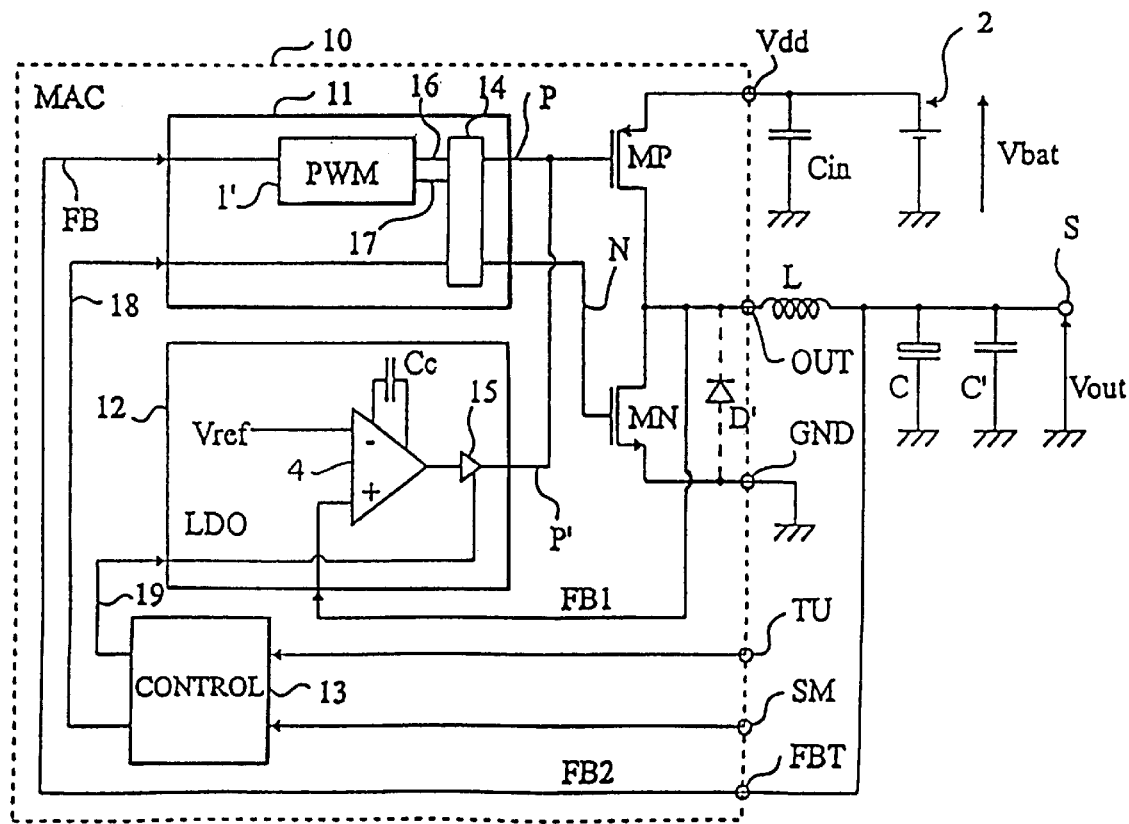
FIG. 3 schematically shows an embodiment of a voltage regulator according to the present invention.

FIG. 3 shows an embodiment of a voltage regulation circuit 10 according to the present invention. This circuit includes two P-channel and N-channel MOS transistors, respectively MP and MN, connected in series between a terminal Vdd meant to be connected to the positive terminal of a rechargeable battery 2 and a ground terminal GND. The midpoint of the series connection of transistors MP, M forms an out put terminal OUT of the circuit. Regulation circuit 10 (MAC) includes two blocks 11, 12 that control the output transistors. A first block 11 is meant to control transistors MP and MN in switched-mode power supply (SMPS) mode. A second block 12 is meant to control transistor MP in linear regulator mode at low waste voltage (LDO). Blocks 11 and 12 are controlled by a circuit 13 (CONTROL) that selects the operating mode of circuit 10. Output terminal OUT of circuit 10 is connected, via an inductance L, to a terminal S providing a load supply voltage Vout. As previously, a capacitor Cin is placed in parallel on rechargeable battery 2, and a storage capacitor C and a decoupling capacitor C' are connected in parallel between terminal S and the ground.

A characteristic of the present invention is that, to enable the selection of the operating mode of circuit 10 by minimizing the response time due to the high gate capacitance of transistor MP, a circuit, respectively 14, 15, controllable in an output state at high impedance, is provided at the output of blocks 11 and 12.

Circuit 11 conventionally includes a pulsewidth modulation (PWM) control block 1' that controls the gates of transistors MP and MN. A first output 16 of block 1' is connected, via a tri-state amplifier (not shown) of circuit 14, to the gate of transistor MP. A second output 17 of block 1' is connected, via a switch (preferably, a tri-state amplifier, not shown) of circuit 14 to the gate of transistor MN. Circuit 14 is controlled by a signal 18 provided by circuit 13. Block 1' is, conventionally, controlled by a signal FB taken from an input terminal FBT of circuit 10, connected to terminal S to measure the output voltage. If desired, this measurement of the output voltage may be performed as is shown in FIG. 1, via a resistive dividing bridge. Block 1' also receives a clock signal (not shown).

According to the present invention, block 1' however has a single operating mode, that is, a pulsewidth modulation at fixed frequency. Indeed, according to the present invention, a variable frequency operating mode is not necessary.

Linear regulation circuit 12 includes, conventionally, an error amplifier 4 that amplifies the voltage on the drain of transistor MP with respect to a reference voltage Vref. An inverting input of error amplifier 4 receives voltage Vref and a non-inverting input receives a signal FBI taken from terminal our. The output of the error amplifier is connected, via circuit 15 (for example, a tri-state amplifier), to the gate of transistor MP. Circuit 15 is controlled by a signal 19 provided by general control block 13.

According to the present invention, when the regulator has to operate as a switched-mode power supply, the switches or tri-state amplifiers of circuit 14 are conductive and output P' of amplifier 15 is placed in a high impedance state. Thus, from a functional point of view, everything occurs as if circuit 12 did not exist. In switched-mode power supply, the operation of the regulator according to the present invention is then perfectly conventional from a functional point a view.

When regulation circuit 10 has to operate as a linear regulator, the first output P of circuit 14 is placed in a high impedance state and its second output N is forced to the low state, that is, to the ground. Tri-state amplifier 15 is placed in a conductive state by signal 19. Thus, from a functional point of view, everything then occurs as if circuit 11 and transistor MN did not exist. The recovery diode associated with inductance L here is formed, for example, by intrinsic diode D' of transistor MN. This diode is however not incompatible with the switched-mode power supply operation.

Figure 2:
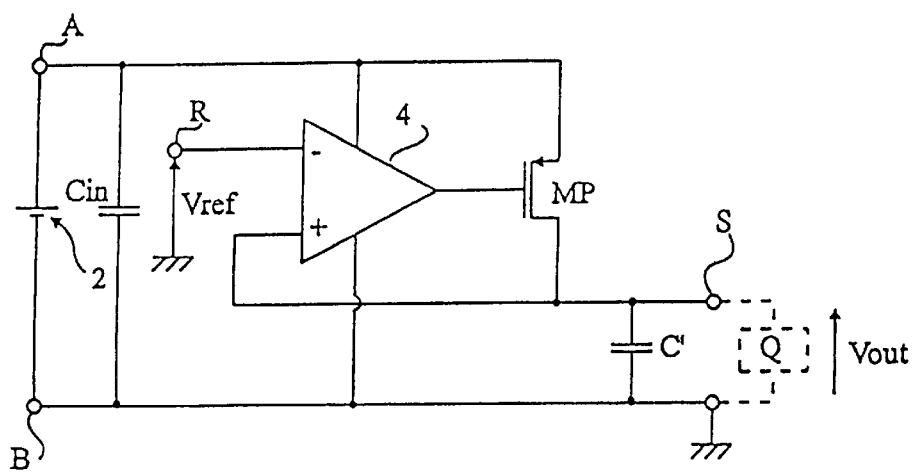

However, the stability of a conventional linear regulator generally necessitates the use of a capacitor C' (FIG. 2). This capacitor is not compatible with the operation of the regulator in switched mode. Thus, according to the present invention, an internal compensation capacitor Cc is used to guarantee the stability of the operation as a linear regulator. This type of compensation is within the abilities of those skilled in the art based on the functional indications given hereabove.

In linear regulation, it should be noted that the presence of inductance L is not disturbing provided that it has a low equivalent series resistance.

An advantage of using tri-state amplifiers for the switching performed by circuits 14 and 15 is that the power consumption is thus minimized with respect to the use of single switches. Indeed, a single switch introduces a low resistance which is either connected to the ground or connected to a positive voltage of control of the gate of the MOS transistor to which the switch is connected. Such a connection to the gate of the MOS transistor causes high charge and discharge currents of the equivalent stray capacitances between the gate of the MOS transistor and the ground. Further, the low series resistance introduced by a single switch causes delays on the control signals which become unacceptable for operating frequencies of the switched-mode power supply on the order of several hundreds of kHz.

Figure 4:
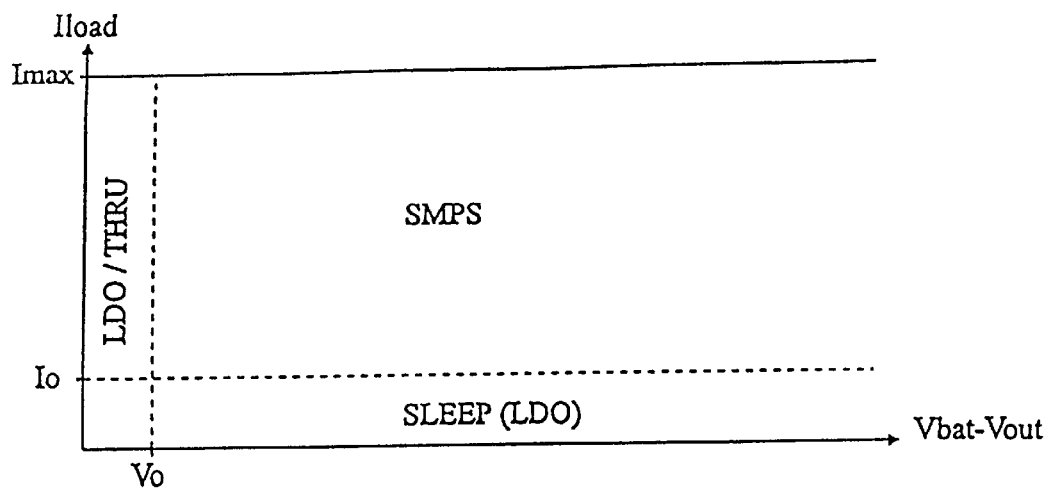
FIG. 4 illustrates the operation of the regulator shown in FIG. 3 according to the battery voltage and to the current consumed by the load.
Figure 5:
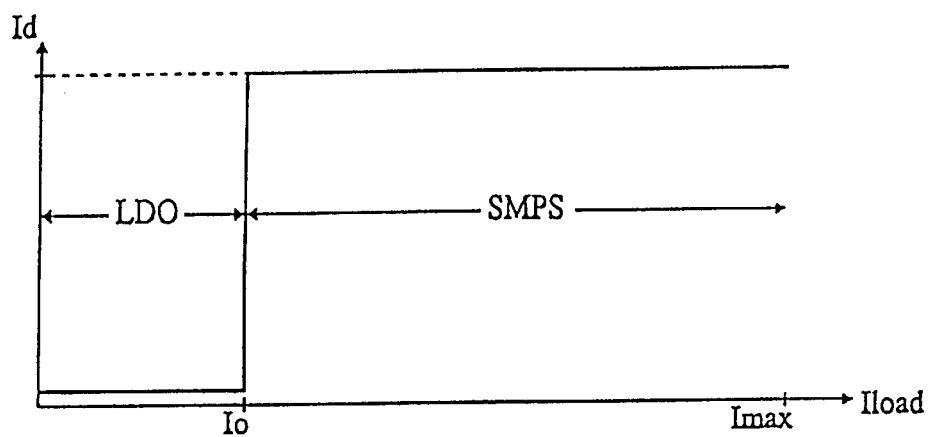
FIG. 5 shows the current consumption characteristic of the regulator according to the present invention with respect to the current consumed by the load.
Figure 6:
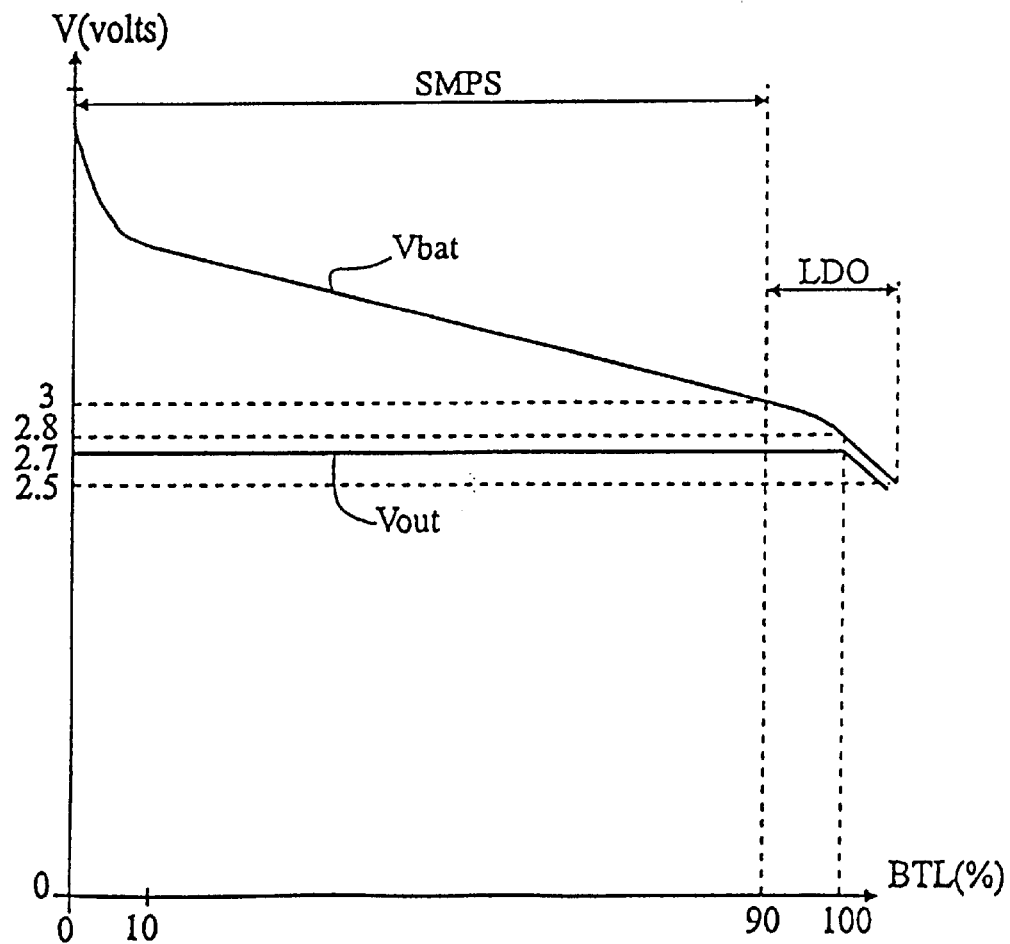
FIG. 6 illustrates the operation of a regulator according to the present invention supplied by a lithium-ion type battery.

The selection control of the operating mode of circuit 10 according to the present invention is described hereafter in relation with FIGS. 4 to 6.

FIG. 4 illustrates the operating mode selected according to current Iload consumed by the load and to voltage difference Vbat−Vout.

When the current consumed by the load is lower than a predetermined threshold value I0, the regulator operates as a linear regulator (LDO). When, at the same time, current Iload is higher than value I0 and difference Vbat−Vout is higher than a predetermined threshold value V0, the regulator operates as a switched-mode power supply (SMPS). When the voltage difference between input Vdd and output Vout of the regulator is lower than voltage V0, regulator 10 operates, for example, as a linear regulator over the entire range (0-Imax) of current likely to be consumed by the load (LDO).

The measuring of the current and voltage with respect to the threshold values can be internal or external to regulation circuit 10. In an embodiment where these measurements are internal to the circuit, this circuit is provided with means of measurement of the current consumed by the load. A series resistor could for example be used for this measurement. However, it will be preferred to use a MOS transistor connected in parallel on transistor MP to extract an image of the current crossing this transistor. Increase the waste voltage of the regulator is thus avoided. Based on the measurement of the current consumed by the load, the measured value is compared with a threshold value internal to the circuit to select the operating mode of the regulator.

Similarly, means of measurement of the voltage difference between terminals Vdd and Vout could be provided to compare this voltage difference with value V0 and switch the circuit accordingly.

In an embodiment of the present invention, especially meant for a mobile phone, it will, however, be preferred to use signals available within the load to control the regulator according to the present invention. In particular, in a conventional mobile phone, the charge state of the battery is known, in order to warn the user that it needs recharging.

According to this embodiment, the voltage regulator of the present invention has, in addition to the switched-mode power supply operation, three possible operating modes.

A first operating mode (THRU) can be used if output terminal S is only connected to an input of a step-down post-regulator of voltage Vout or to inputs of post-regulators of this type (not shown). Transistor MP can then be turned permanently on and then only exhibit a low series resistance in the on state (Rdson). Such an operating mode (THRU), where transistor MP is saturated, is, for example, enabled by means of a signal TU indicative of the charge state of the battery with respect to a threshold value V0. For example, for an output voltage Vout of 2.7 volts, signal TU is in the low state when the voltage across the battery is lower than 3 volts. It should be noted that this "forced" operating mode is optional.

A second operating mode (SLEEP) corresponds to the linear regulator operating mode in which the current consumed by the load is higher than a threshold value I0. However, in the preferred embodiment illustrated by FIG. 3, the low current operating mode corresponds to a stand-by mode of the mobile phone in the absence of a communication. This mode is thus known by the telephone control circuit. Circuit 10 then includes a terminal SM receiving a two-state signal indicative of a setting to stand-by of the mobile phone.

A third operating mode (LDO) corresponds to the case where the input voltage is low (lower than threshold V0). In this case, the linear regulator has a very good efficiency, whatever the output current Iload. This operating mode is, for example, enabled as in the preceding mode (SLEEP) by a state switching of the signal present on terminal SM when voltage Vbat is lower than a known threshold value of the control circuit of the mobile phone.

It should be noted that these different operating modes SLEEP (LDO) and LDO/TFIRU can be combined at the will of the user when, at the same time, Vbat−Vout<V0 and Iload<I0. For example, mode THRU can be preferred to mode SLEEP in this particular operating area. The selection is performed by adapting circuit 13 according to the application.

A voltage regulator according to the present invention combining at least the last two operating modes, that is, operating as a linear regulator when voltage Vbat−Vout and/or current Iload are lower than values V0, respectively I0, already has several advantages with respect to conventional regulators.

An advantage of the present invention is that all operations of the voltage regulator are independent from the type of battery used.

Another advantage of the present invention is that it minimizes or at least reduces the regulator power consumption while guaranteeing a low waste voltage during stand-by periods thereof.

Another advantage of the present invention, in the case where the first operating mode is omitted, is that it enables use of a linear regulator sized for a low current, which further minimizes or at least reduces the regulator power consumption during stand-by periods.

Another advantage of the present invention, in the case where the third operating mode is provided, is that it increases the possible duration of use of the battery between two recharge periods.

FIG. 5 shows the characteristic of current Id consumed by the regulator of the present invention according to the current Iload consumed by the load. When the current consumed by the load is lower than a value I0, the current consumed by the regulator is at a low value set by the linear regulator. When current Iload is higher than value I0, the current consumed by the regulator has a constant maximum value set by the switched-mode power supply.

FIG. 6 illustrates the operation, in terms of duration of use (BTL) between two recharge periods, of a lithium-ion type battery by means of a regulator according to the present invention. It is assumed that voltage Vout is set to 2.7 volts and that circuit 11 requires a voltage Vdd of 3 volts to operate properly. Value V0 is thus set to 3 volts. FIG. 6 does not take into account stand-by periods of the load.

As long as voltage Vbat is higher than 3 volts and current Iload is higher than I0, regulator 10 operates as a switched-mode power supply (SMPS). When voltage Vbat becomes lower than 3 volts, the linear regulator operation takes over and enables proper supply of the load until the voltage reaches a limiting value (for example, 2.8 volts) corresponding to the series voltage drop of MOS transistor MP. Thus, with respect to the duration during which a lithium-ion battery is capable of providing a 3 volt voltage, the present invention increases by, on the order of 10%, the time during which the regulator can properly supply the load. It should be noted that once voltage Vbat has reached a value close to the linear mode regulation threshold (for example, 2.8 volts), the load can, according to the present invention, still be supplied whereas, in a conventional switched-mode power supply circuit (FIG. 1), its supply stops since transistor MP can no longer be biased. Voltage Vout then follows the shape of voltage Vbat, minus the series voltage drop in transistor MP.

In the example shown in FIG. 6, an efficiency higher than 90% is obtained when the regulator operates as a switched-mode power supply and an efficiency included between 90 and 96% is obtained when the regulator operates in linear mode.

An advantage of the present invention is that it optimizes or at least improves the respective operations of a switched-mode power supply and of a linear regulator while enabling the use of any type of battery.

Preferably, threshold value I0 is set according to the load. Here, a new advantage of an external measurement of the current surged by the load appears, which is that the user can then modify this parameter as desired. Thus, the voltage regulator according to a preferred embodiment of the present invention is perfectly changeable according to the load for which it is meant.

Another advantage of the present invention is that it reduces or eliminates any filtering need linked to the operation at variable frequency of conventional switched-mode power supplies meant for mobile phones.

In the case where the current consumed by the load can vary linearly, threshold value I0 will be chosen to optimize the efficiency of the regulator between the two operating modes.

As a specific example of embodiment, applied to a voltage regulator meant for a mobile phone, the following values may be chosen for the different components:

Cin is a ceramic capacitor of 100 nF;

C is a chemical capacitor of 22 $\mu$F having a low equivalent series resistance;

C' is a chemical capacitor of 100 nF; and

L=10 $\mu$H with an equivalent series resistance of 0.3 Ohms.

Of course, the present invention is likely to have various alterations, modifications, and improvements which will readily occur to those skilled in the art. In particular, the practical implementation of the voltage regulator according to the present invention is within the abilities of those skilled in the art based on the functional indications given hereabove. Further, although the present invention has been described in relation with a positive voltage regulator, the present invention of course applies to a negative voltage regulator and the modifications to be brought to the described embodiment are within the abilities of those skilled in the art.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. A voltage regulator meant to supply a load from a battery, including:

a first switched-mode power supply type voltage regulation component;

a second linear regulator type voltage regulation component;

a control means for selecting one of the two regulation components according to the voltage difference between the battery voltage and the output voltage;

wherein the linear regulation component is selected when the voltage difference is lower than a first predetermined threshold value;

wherein the switched-mode power supply component is selected when the current consumed by the load is higher than a second predetermined threshold value; and wherein the switched-mode power supply component is selected when both the voltage difference is higher than the first threshold value and the current consumed by the load is higher than the second threshold value.

2. The voltage regulator of claim 1, wherein the switched-mode power supply component is selected when the current consumed by the load is higher than a second predetermined threshold value.

3. The voltage regulator of claim 1, including:
   two MOS transistors connected in series between two terminals that receive the battery voltage;
   a pulsewidth modulation control circuit that controls the transistors;
   a linear control circuit that controls the first transistor; and
   a selection circuit that selects the control circuit.

4. The voltage regulator of claim 3, wherein respective output signals of the control circuits, sent onto the gate of the first MOS transistor, are provided by tri-state amplifiers.

5. The voltage regulator of claim 3, wherein the voltage regulator includes an unregulated operating mode, in which the first transistor is saturated.

6. The voltage regulator of claim 1, meant to supply a mobile phone, and including a terminal that can receive a signal indicative of the stand-by state of the mobile phone.

7. A voltage regulator adapted to supply a load from a battery, comprising:
   a first switched-mode power supply type voltage regulation component;
   a second linear regulator type voltage regulation component; and
   a control circuit that selects one of the two regulation components according to the voltage difference between the battery voltage and the output voltage;
   wherein the linear regulation component is selected when the voltage difference is lower than a first predetermined threshold value;
   wherein the switched-mode power supply component is selected when the current consumed by the load is higher than a second predetermined threshold value; and
   wherein the switched-mode power supply component is selected when both the voltage difference is higher than the first threshold value and the current consumed by the load is higher than the second threshold value.

8. The voltage regulator of claim 7, wherein the control circuit selects one of the regulation components according to the current consumed by the load.

9. The voltage regulator of claim 7, including:
   two MOS transistors connected in series between two terminals that receive the battery voltage;
   a pulsewidth modulation control circuit that controls the transistors;
   a linear control circuit that controls the first transistor; and
   a selection circuit that selects the control circuit.

10. The voltage regulator of claim 9, wherein respective output signals of the control circuits, sent onto the gate of the first MOS transistor, are provided by tri-state amplifiers.

11. The voltage regulator of claim 9, wherein the voltage regulator includes an unregulated operating mode, in which the first transistor is saturated.

12. The voltage regulator of claim 1, adapted to supply a mobile phone, and including a terminal that can receive a signal indicative of the stand-by state of the mobile phone.

13. A method of supplying a load from a battery, comprising the steps of:
   selecting a linear regulator type voltage regulation when a voltage difference between a battery voltage and an output voltage is lower than a first predetermined threshold value;
   selecting switched-mode type voltage regulation when a current consumed by the load is higher than a second predetermined threshold value; and
   selecting switched-mode type voltage regulation when both the voltage difference is higher than the first threshold value and the current consumed by the load is higher than the second threshold value.

* * * * *